US009417510B2

(12) United States Patent
Kanai et al.

(10) Patent No.: US 9,417,510 B2
(45) Date of Patent: Aug. 16, 2016

(54) IMAGE PROJECTION DEVICE AND METHOD OF CONTROLLING IMAGE PROJECTION DEVICE

(71) Applicants: Hideo Kanai, Tokyo (JP); Tetsuya Fujioka, Kanagawa (JP); Masamichi Yamada, Kanagawa (JP); Satoshi Tsuchiya, Kanagawa (JP); Naoyuki Ishikawa, Kanagawa (JP); Akihisa Mikawa, Kanagawa (JP); Yasunari Mikutsu, Tokyo (JP)

(72) Inventors: Hideo Kanai, Tokyo (JP); Tetsuya Fujioka, Kanagawa (JP); Masamichi Yamada, Kanagawa (JP); Satoshi Tsuchiya, Kanagawa (JP); Naoyuki Ishikawa, Kanagawa (JP); Akihisa Mikawa, Kanagawa (JP); Yasunari Mikutsu, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 87 days.

(21) Appl. No.: 14/331,636

(22) Filed: Jul. 15, 2014

(65) Prior Publication Data
US 2015/0029471 A1   Jan. 29, 2015

(30) Foreign Application Priority Data

Jul. 24, 2013   (JP) ................................ 2013-153996

(51) Int. Cl.
*G03B 21/16*   (2006.01)
*G03B 21/14*   (2006.01)
*H04N 9/31*   (2006.01)

(52) U.S. Cl.
CPC .............. *G03B 21/16* (2013.01); *G03B 21/145* (2013.01); *H04N 9/3144* (2013.01)

(58) Field of Classification Search
CPC ..... G03B 21/16; G03B 21/145; H04N 9/3144
See application file for complete search history.

(56) References Cited

U.S. PATENT DOCUMENTS

| 6,072,458 A * | 6/2000 | Asakawa ................. G09G 3/36 345/101 |
| 6,072,459 A * | 6/2000 | Asakawa .......... G02F 1/133382 345/101 |
| 6,322,218 B1 * | 11/2001 | Sugawara ............ H04N 5/7441 348/E5.141 |
| 2007/0019168 A1 | 1/2007 | Nakagawa et al. |
| 2008/0094581 A1 * | 4/2008 | Nakagawa ............. G03B 21/16 353/58 |
| 2008/0284985 A1 * | 11/2008 | Suzuki ................... G03B 21/16 353/58 |
| 2011/0050435 A1 * | 3/2011 | Katayama ............. G03B 21/16 340/635 |

FOREIGN PATENT DOCUMENTS

| JP | 4036874 | 11/2007 |
| JP | 2012-032583 | 2/2012 |

* cited by examiner

*Primary Examiner* — Toan Ton
*Assistant Examiner* — Magda Cruz
(74) *Attorney, Agent, or Firm* — Harness, Dickey & Pierce, P.L.C.

(57) ABSTRACT

An image projection device includes: a centrifugal fan that sends air circulating through a casing to a light source; a heat generator that generates heat with supply of power and that is provided in the vicinity of an ejection port of the centrifugal fan; a temperature sensor that is provided to be adjacent to the heat generator; and a controller that monitors lowering of the velocity of the air, which is sent from the centrifugal fan, on the basis of the value of a temperature measured by the temperature sensor.

5 Claims, 9 Drawing Sheets ration
IMAGE PROJECTION DEVICE AND METHOD OF CONTROLLING IMAGE PROJECTION DEVICE

CROSS-REFERENCE TO RELATED APPLICATION(S)

The present application claims priority to and incorporates by reference the entire contents of Japanese Patent Application No. 2013-153996 filed in Japan on Jul. 24, 2013.

BACKGROUND OF THE INVENTION

1. Field of the Invention

The present invention relates to an image projection device and a method of controlling the image projection device.

2. Description of the Related Art

Image projection devices are known that modulate a beam emitted from a light source by using image data from, for example, a personal computer or a camera, and emit the modulated beam onto, for example, a screen to display an image.

For light sources of image projection devices, halogen lamps, metal halide lamps, and high pressure mercury lamps, etc. are used. The temperature of such light sources rises to a maximum of approximately 1000° C. An image projection device takes in air with a blowing unit, such as a blower or fan, from outside the image projection device and circulates the air through the image projection device to cool down the inside of the image projection device. Because the light source in particular rises to a high temperature from among the components in the image projection device, a centrifugal fan may be additionally provided to send the air circulating through the casing to the light source.

A centrifugal fan has a larger number of blades for sending the air than that of an axial flow fan and thus has a small blade pitch, which leads to a narrow flow path. For this reason, dust tends to become attached to centrifugal fans, which tends to lower their blowing ability.

However, conventional-method centrifugal fans for sending the air circulating through the casing to the light source cannot detect the lowering of the blowing ability. There are conventional methods of detecting an abnormality, such as a case where the cooling ability becomes extremely low due to the rotation of a centrifugal fan stopping or a case where a temperature protector is tripped, i.e., because safety cannot be ensured. However, with such abnormality detection methods, lowering of the blowing ability of a centrifugal fan cannot be detected.

Furthermore, a method is known of detecting the clogging of a dust filter by measuring the difference in temperature between the inside and outside of the image projection device (see Laid-open Patent Publication No. 2012-32583). However, even if the difference in temperature between the inside and outside of the image projection device is measured, it cannot be determined whether a problem has occurred in the centrifugal fan.

Therefore, it is desirable to provide an image projection device and a method of controlling the image projection device, each of which can monitor lowering of the blowing ability of the blower for sending the air circulating through the casing to the light source.

SUMMARY OF THE INVENTION

It is an object of the present invention to at least partially solve the problems in the conventional technology.

According to an aspect of the present invention, there is provided an image projection device including: a blowing unit that sends air circulating through a casing to a light source; a heat generator that generates heat with supply of power and that is provided in the vicinity of an ejection port of the blowing unit; a temperature detector that is provided to be adjacent to the heat generator; and a controller that monitors lowering of the velocity of the air, which is sent from the blowing unit, on the basis of the value of a temperature measured by the temperature detector.

According to another aspect of the present invention, there is provided a method of controlling an image projection device including: a blowing unit that sends air circulating through a casing to a light source; a heat generator that generates heat with supply of power and that is provided in the vicinity of an ejection port of the blowing unit; and a temperature detector that is provided to be adjacent to the heat generator, the method including: monitoring lowering of the velocity of the air, which is sent from the blowing unit, on the basis of the value of a temperature measured by the temperature detector.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a side view of a light source unit viewed from a side from which air flows in;

DETAILED DESCRIPTION OF THE PREFERRED EMBODIMENTS

Image Projection Device

A projector serving as an embodiment of an image projection device to which the invention is applied will be described below. A projector projects an image or a video image (simply referred to as "an image etc." below) using image data or video image data that is input from, for example, a personal computer or a video camera. There are various types of projectors including projectors using a liquid crystal panel and projectors using a DMD (Digital Micro-mirror Device).

For projectors using liquid crystal panel, there has been a progress in increasing the resolution of liquid crystal panels, in improvement in brightness according to an increase in the efficiency of light source lamps, and in reducing the cost. In contrast, Projectors using a DMD are small and light and thus are widely used not only in offices and schools but also at home. The projector to be described below is a front type projector using a DMD but this does not limit the types of projectors that can be applied to the embodiment and projectors using liquid crystal panels can be applied as appropriate.

Figure 1:
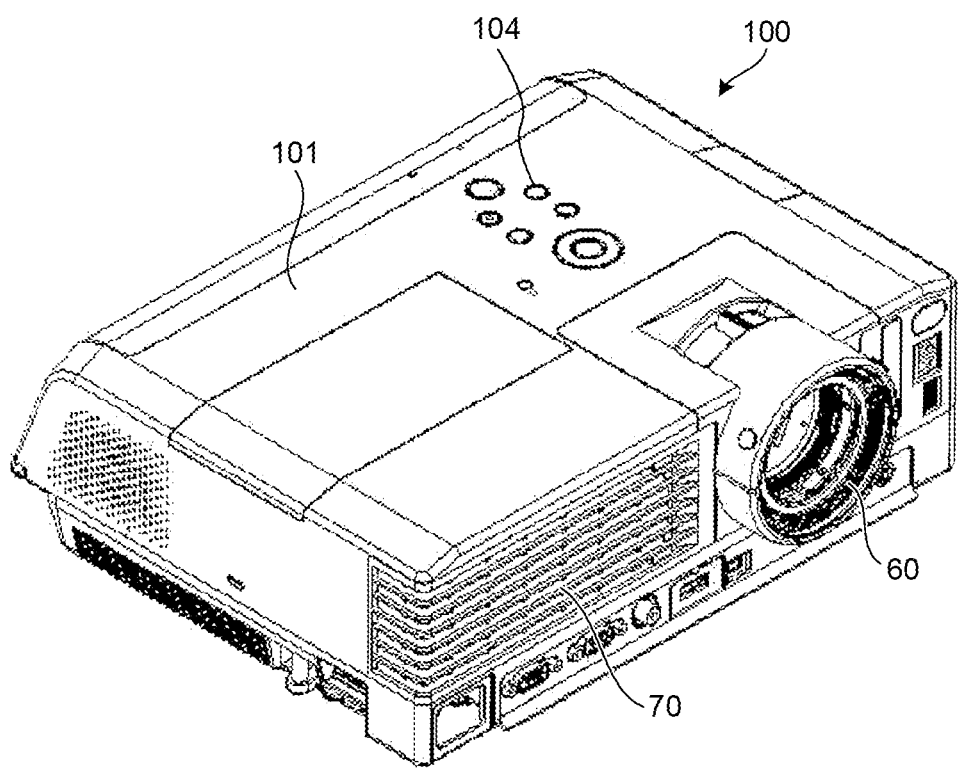
FIG. 1 is a perspective view of a projector according to an embodiment.
Figure 2:
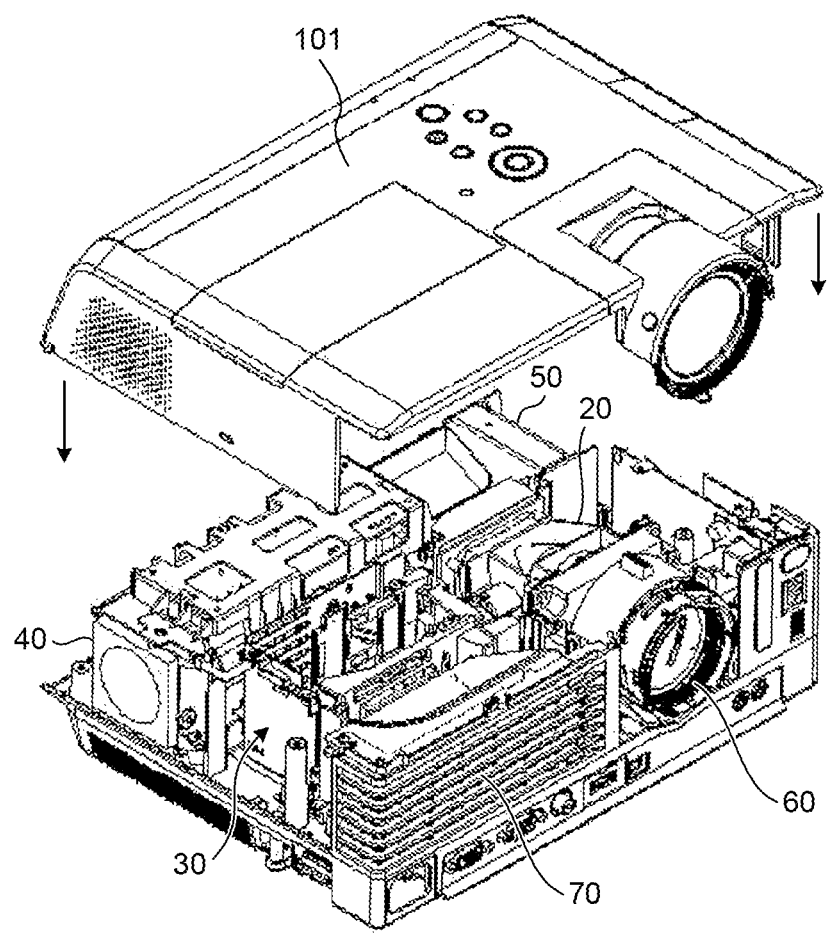
FIG. 2 is a perspective view of the projector with its top cover detached.
Figure 3:
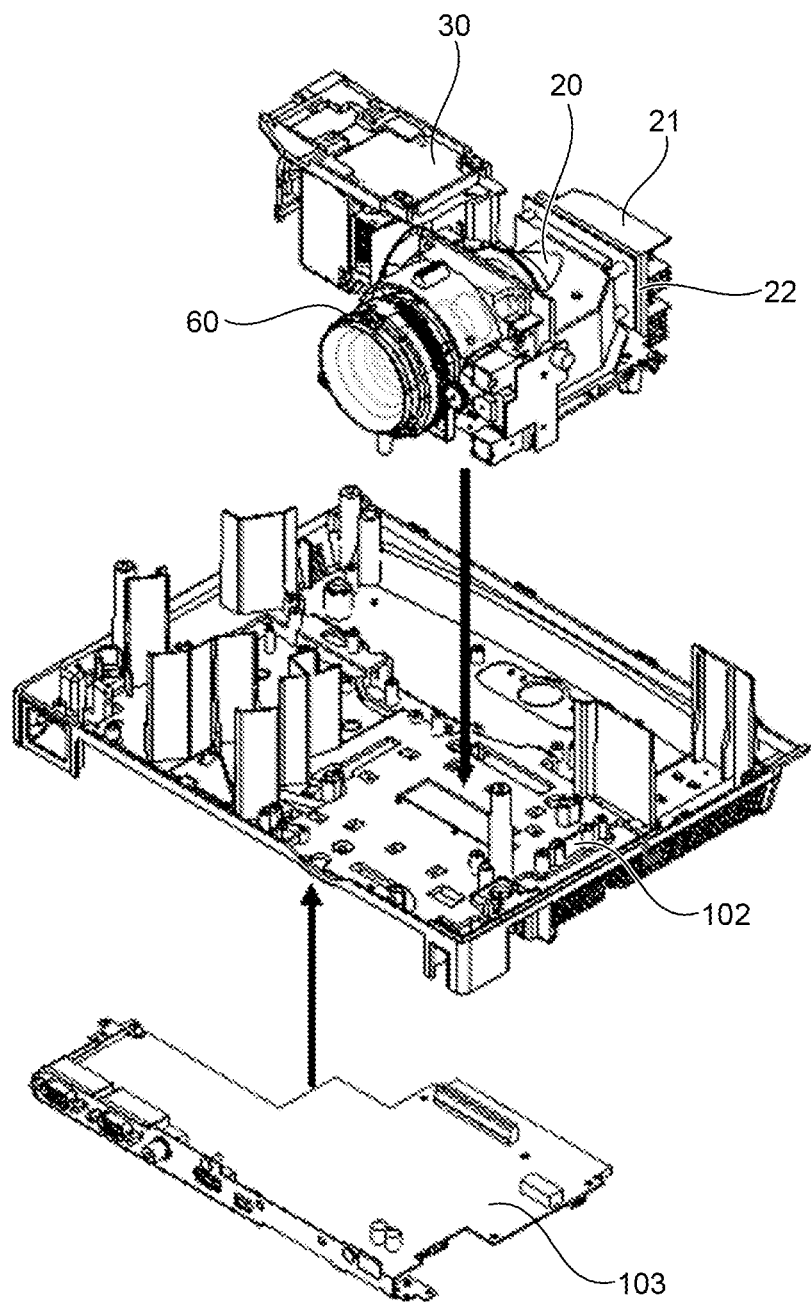
FIG. 3 is a perspective explosive view of the projector with its top cover detached.

FIG. 1 is a perspective view of a projector 100 according to an embodiment. FIG. 2 is a perspective view of the projector 100 with its top cover 101 detached. FIG. 3 is a perspective explosive view of the projector 100 with its top cover 101 detached. As illustrated in FIGS. 1 to 3, the projector 100 includes an optical engine unit 20, a light source unit 30, a speaker unit 40, an inlet 50, a projection lens 60, and an outlet 70.

The optical engine unit 20 is a main component for projecting an image etc. onto a projection plane via the projection lens 60. The projection lens 60 can change the magnification of the image etc. that is eventually projected onto the projection plane. The light source unit 30 guides illuminating light to the optical engine unit 20. The speaker unit 40 outputs sound in combination with an image etc. particularly when a video image is projected onto the projection plane.

From the inlet 50, external air is taken in to cool down the inside of the casing of the projector 100. From the outlet 70, the heat generated in the casing of the projector 100 is discharged together with the external air that is circulated through the casing of the projector 100. The external air that is taken in from the inlet 50 circulates through a heater, such as the optical engine unit 20 and the light source unit 30, and eventually reaches the outlet 70.

As illustrated in FIG. 13, the components of the projector 100, such as the optical engine unit 20 and the light source unit 30, are fixed to the top surface of a base casing 102 (i.e., between the base casing 102 and the top cover 101). On the other hand, a main board 103 including the main circuit unit of the projector 100 is fixed to the bottom surface of the base casing 102. The main board 103 includes external terminals, such as an RGB terminal, video terminal, audio terminal, USB, RS232C, that are used to connect to external devices.

Figure 4:
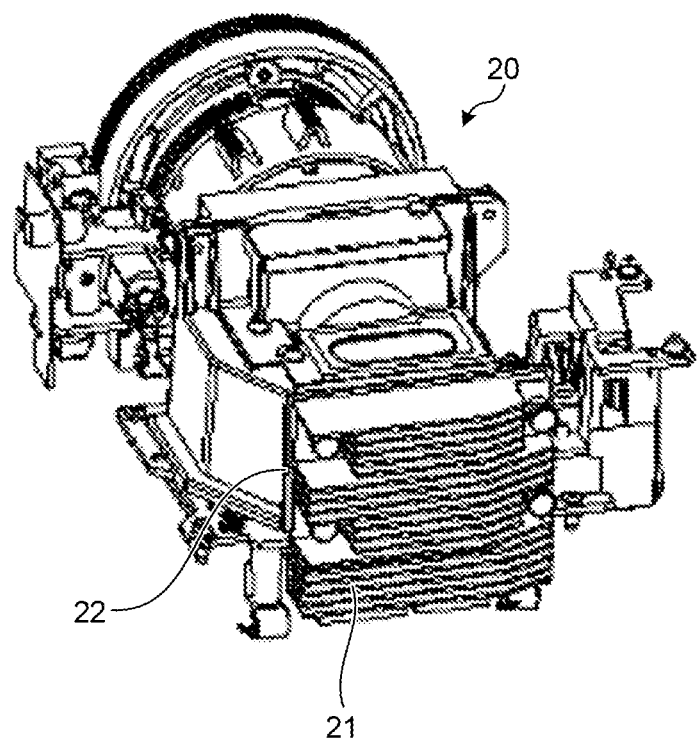
FIG. 4 is a back perspective view of an optical engine unit.

FIG. 4 is a back perspective view of the optical engine unit 20. As illustrated in FIG. 4, the optical engine unit 20 includes a heat sink 21. The heat sink 21 is used to cool off the heat generated by a DMD that is provided in the optical engine unit 20, which will be described below. The heat sink 21 is fixed to the back surface of a DMD board 22 and the DMD is provided to the front surface of the DMD board 22. The DMD and the heat sink 21 make contact with each other via a heat conductive member so that the heat generated by the DMD is efficiently transmitted to the heat sink 21.

Figure 5:
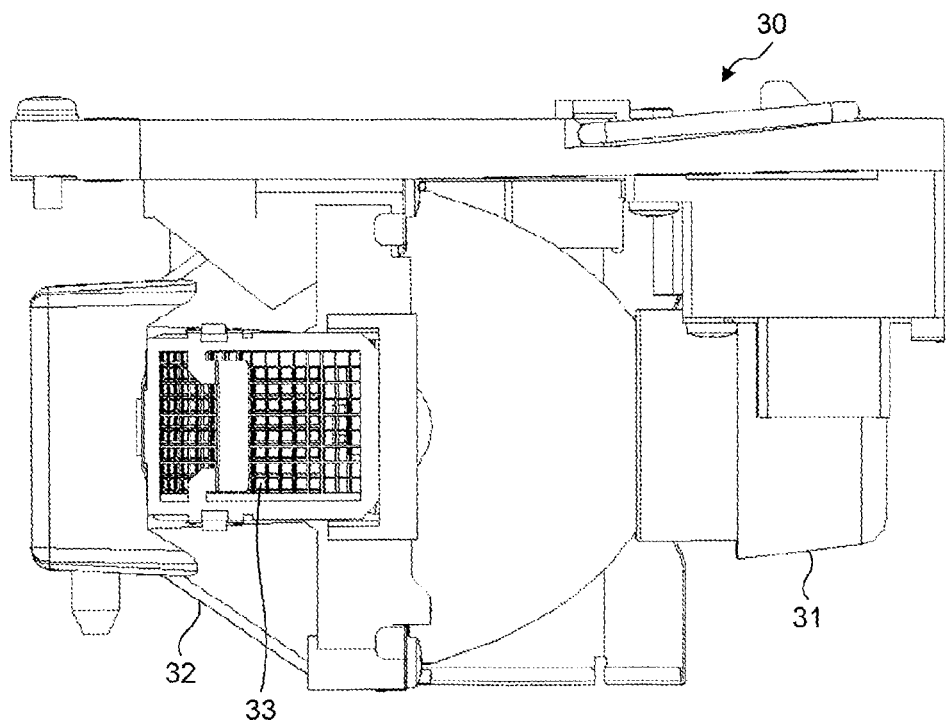
Figure 6:
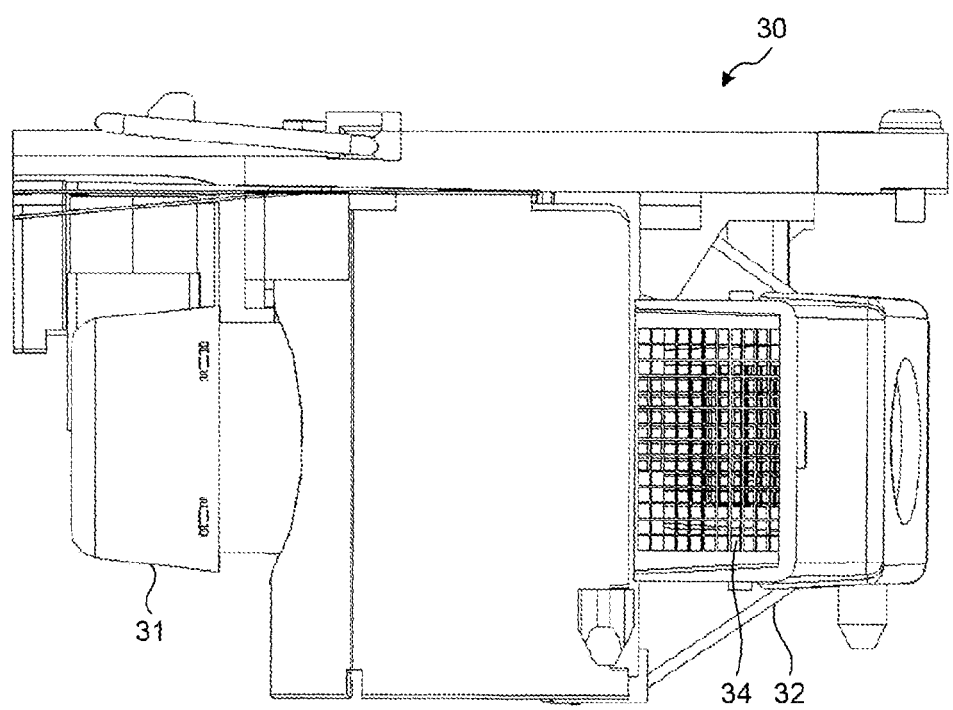
FIG. 6 is a side view of a light source unit viewed from a side from which air is discharged.

FIG. 5 is a side view of the light source unit 30 viewed from a side from which air flows in. FIG. 6 is a side view of the light source unit 30 viewed from a side from which air is discharged. As illustrated in FIGS. 5 and 6, the light source unit 30 has a configuration in which a light source 31 is covered with a light source cover 32 that controls the flow of cooling external air.

As illustrated in FIGS. 5 and 6, a light source inlet 33 is provided to the side surface of the light source cover 32 from which air flows in and a light source outlet 34 is provided to the side surface of the light source cover 32 from which air is discharged. As described below, a blower (a centrifugal fan 52 illustrated in FIG. 8) is provided to the light source inlet 33. The external air that is sent from the light source inlet 33 cools down a luminous tube 35 in the light source unit 30 and is discharged from the light source outlet 34.

Figure 7:
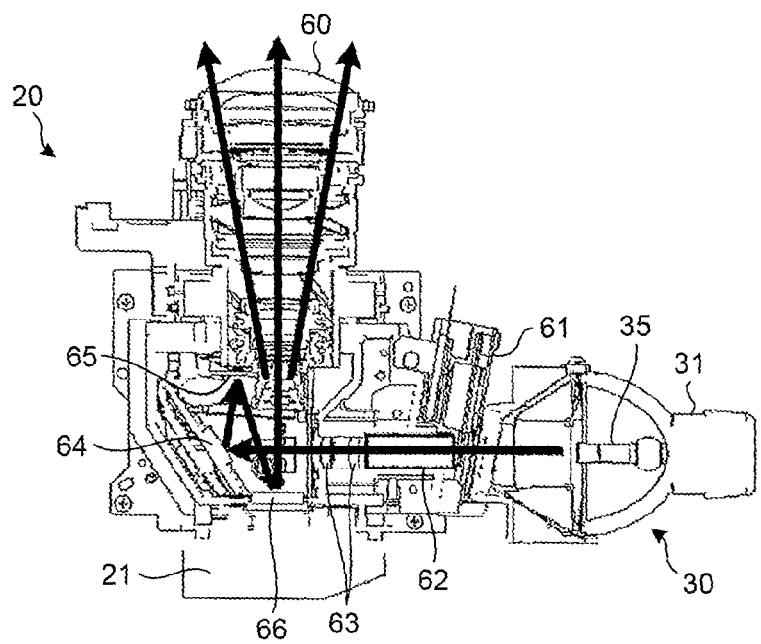
FIG. 7 is a cross-sectional view of an internal configuration of an optical engine unit and a light source unit.

FIG. 7 is a cross-sectional view of an internal configuration of the optical engine unit 20 and the light source unit 30.

As illustrated in FIG. 7, the luminous tube 35 is provided in the light source unit 30. The luminous tube 35 is an illuminating unit of the light source 31 and the illuminating light that is emitted from the luminous tube 35 is guided to the optical engine unit 20.

As illustrated in FIG. 7, the optical engine unit 20 includes a color wheel 61, a light tunnel 62, relay lenses 63, a cylinder mirror 64, and a concave mirror 65. The optical path of the illuminating light that is incident from the light source unit 30 reaches a DMD 66 via the color wheel 61, the light tunnel 62, the relay lenses 63, the cylinder mirror 64, and the concave mirror 65 in sequence.

The color wheel 61 is a circular filter wheel that is fixed to a motor shaft. The color wheel 61 includes filters of, for example, R (red), G (green), and B (blue) for separating the illuminating light by color. The color wheel 61 rotates so that the illuminating light that is transmitted through the color wheel 61 is separated into R, G, and B lights by time-division multiplexing.

The light that is separated by color with the color wheel 61 is incident on the light tunnel 62. The inner periphery of the light tunnel 62 is a mirror surface. Thus, the light that is incident on the light tunnel 62 homogenized while reflecting on the inner periphery of the light tunnel 62 for multiple times and then emitted to the relay lenses 63.

The light that has come out of the light tunnel 62 is transmitted through the two relay lenses 63, is reflected by the cylinder mirror 64 and the concave mirror 65, and is focused on an image generation surface of the DMD 66.

The DMD 66 is, as described above, provided to the front surface of the DMD board 22. In the DMD 66, each micromirror device on the image generation surface is made oblique to switch between an optical path toward the projection lens 60 and an optical path toward an OFF optical board to which the illuminating light is reflected. The OFF optical board is formed with a non-reflective member to end the beam that is not used for image projection.

The micromirror devices on the image generation surface of the DMD 66 are arrayed in a lattice and each micromirror device corresponds to each pixel of the image to be projected. By controlling each micromirror device, the DMD 66 can modulate the emitted illuminating light to projection light that contains the information on the image to be projected.

Cooling System

A cooling system used by the projector 100 will be described here with reference to FIGS. 8 and 9.

Figure 8:
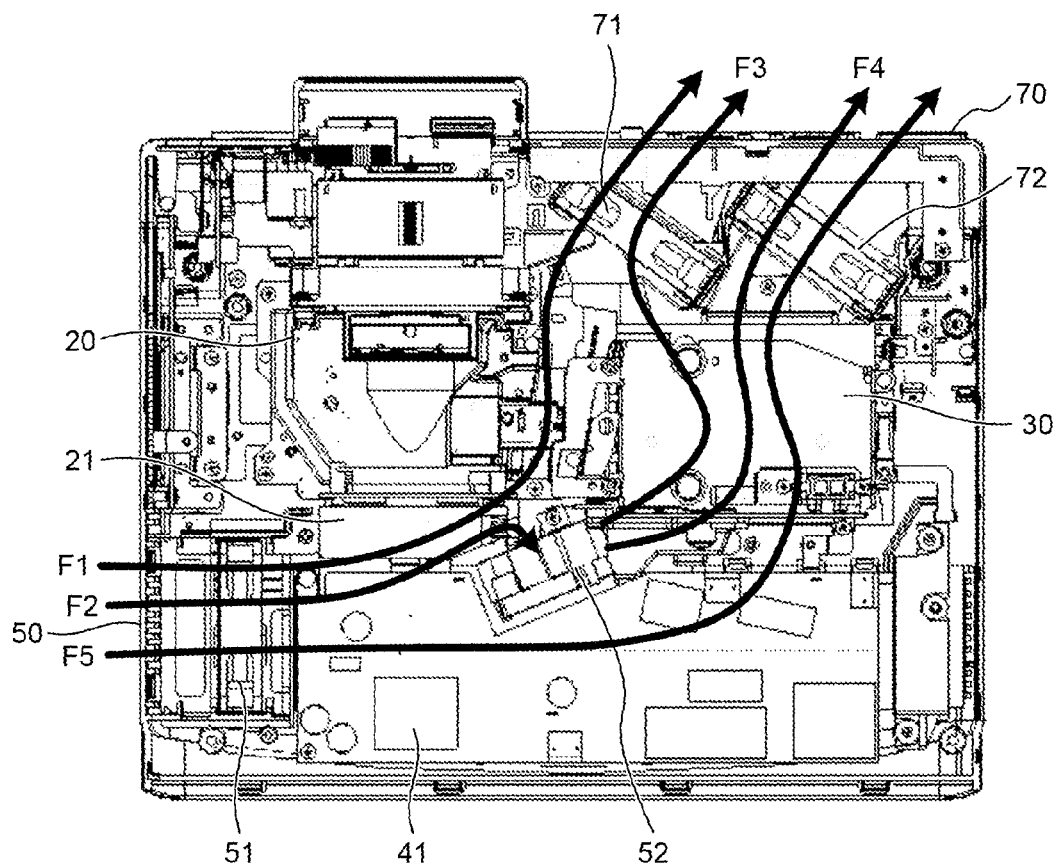
FIG. 8 is a cross-sectional view of the projector illustrating the air flow through the casing of the projector.

FIG. 8 is a cross-sectional view of the projector 100 illustrating the air flow through the casing of the projector 100. As illustrated in FIG. 8, in the vicinity of the inner side with respect to the inlet 50 that is provided to the projector 100, a suction fan 51 is provided.

An air flow F1 that is taken by the suction fan 51 from the inlet 50 into the projector 100 cools down the heat sink 21 for cooling down the DMD 66 and then is discharged by a first discharge fan 71 to the outside of the projector 100 via the outlet 70.

The air flow F2 that is taken by the suction fan 51 from the inlet 50 into the projector 100 is sent into the light source unit 30 by the centrifugal fan 52 that is connected to the light source inlet 33 of the light source unit 30.

The air flow F2 that is sent by the centrifugal fan 52 into the light source unit 30 cools down the luminous tube 35 in the light source unit 30 and then is discharged from the light source outlet 34. The air flow F2 then diverges into air flows F3 and F4. The air flow F3 is discharged by the first discharge fan 71 via the outlet 70 to the outside of the projector 100 and the air flow F4 is discharged by a second discharge fan 72 via the outlet 70 to the outside of the projector 100.

The luminous tube 35 is a part having the highest temperature in the projector 100 and the temperature of the air flow that has cooled down the luminous tube 35 is at a high temperature of 200 to 250° C. Concentration of such an air flow at a high temperature in one of the first discharge fan 71 and the second discharge fan 72 causes a thermal damage on the first discharge fan 71 and the second discharge fan 72. For this reason, the air flow F2 is dispersed to the first discharge fan 71 and the second discharge fan 72.

An air flow F5 that is taken by the suction fan 51 from the inlet 50 into the projector 100 cools down a power supply circuit 41 and the light source unit 30 from the outer side and then is discharged by the second discharge fan 72 via the outlet 70 to the outside of the projector 100.

Figure 9:
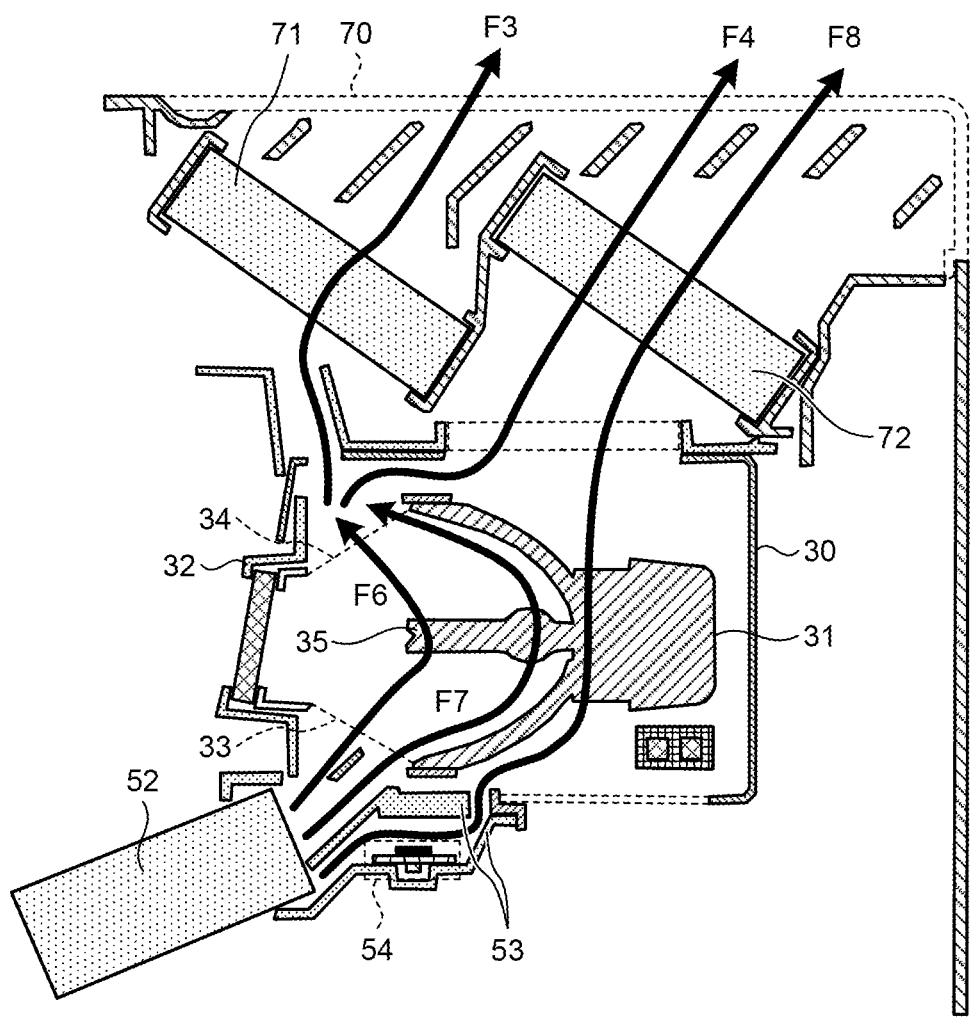
FIG. 9 is a cross-sectional view of the projector illustrating the air flow in the vicinity of the light source unit.

FIG. 9 is a cross-sectional view of the projector 100 illustrating the air flow in the vicinity of the light source unit 30. As illustrated in FIG. 9, the air flows F6 and F7 that are sent from the light source inlet 33 into the light source 31 cool down the luminous tube 35 and are discharged from the light source outlet 34. In the vicinity of the light source outlet 34, the guide path diverges into two directions and the air flows F6 and F7 that are discharged from the light source outlet 34 diverge to the air flows F3 and F4. Thereafter, as described above, the air flow F3 is discharged by the first discharge fan 71 via the outlet 70 to the outside of the projector 100 and the air flow F4 is discharged by the second discharge fan 72 via the outlet 70 to the outside of the projector 100.

As illustrated in FIG. 9, an air flow F8 that is sent into the light source unit 30 via an air control dust 53 to the light source unit 30 cools down the light source 31 from the outer side and then is discharged by the second discharge fan 72 via the outlet 70 to the outside of the projector 100. A temperature detection device 54 is provided within the air control dust 53 and the light source unit 30 is cooled down with the external air sent by the centrifugal fan 52. The position in which the temperature detection device 54 is provided is not limited to the position indicated in FIG. 9. The embodiment can be carried out properly as long as the temperature detection device 54 is provided in the vicinity of an ejection port of the centrifugal fan 52 and in a position where the sent external air properly blows against the temperature detection device 54.

Temperature Detection Device

Figure 10:
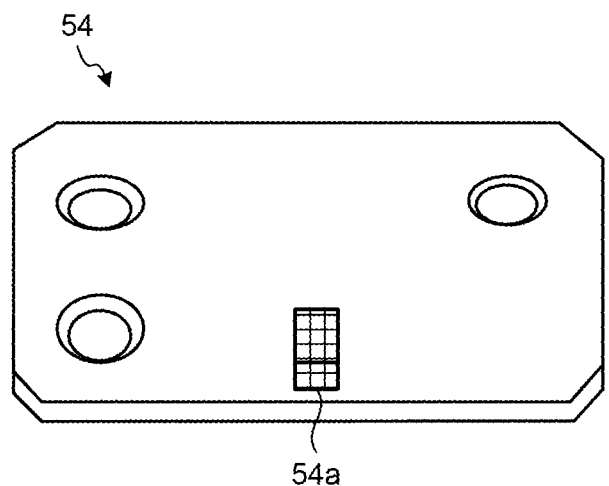
FIG. 10 is a perspective view of a configuration of the front surface of a temperature detection device.

An exemplary configuration of the temperature detection device 54 will be described here with reference to FIGS. 10 and 11. FIG. 10 is a perspective view of a configuration of the front surface of the temperature detection device 54 and FIG. 11 is a perspective view of a configuration of the back surface of the temperature detection device 54.

Figure 11:
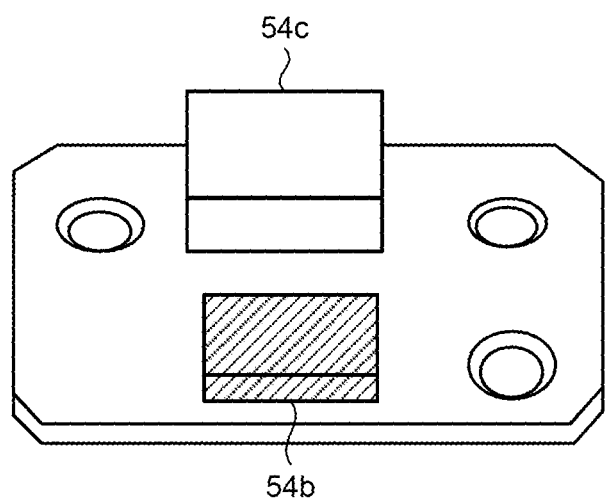
FIG. 11 is a perspective view of a configuration of the back surface of the temperature detection device.

As illustrated in FIGS. 10 and 11, the temperature detection device 54 includes a temperature sensor 54*a* on the front surface of the board and a heat generator 54*b* on the back surface of the same board. The heat generator 54*b* contains a heat generating member that is heated with power supplied via a connector 54*c*. The heat generated by the heat generator 54*b* is transmitted to the temperature sensor 54*a* via the board. The temperature sensor 54*a* measures the heat generated by the heat generator 54*b* via thermal transmission.

It is satisfactory if the temperature sensor 54*a* and the heat generator 54*b* be provided to be adjacent to each other such that the temperature sensor 54*a* measures the temperature of the heat generated by the heat generator 54*b* via thermal transmission. The embodiment can be properly carried out as long as a proper heat conductive material is provided between the temperature sensor 54*a* and the heat generator 54*b* and the heat conductive material is configured to be cooled down with air.

As described above, the temperature detection device 54 is arranged in the vicinity of the ejection port of the centrifugal fan 52 and is cooled down with external air that is sent from the centrifugal fan 52. Because the temperature sensor 54*a* measures the heat after thermal transmission, the value measured by the temperature sensor 54*a* is kept at a given low value if the temperature detection device 54 is properly cooled down. In contrast, when clogging of the centrifugal fan 52 occurs and thus the temperature detection device 54 is not properly cooled down, the temperature sensor 54*a* indicates an abnormal measured valued.

Figure 12:
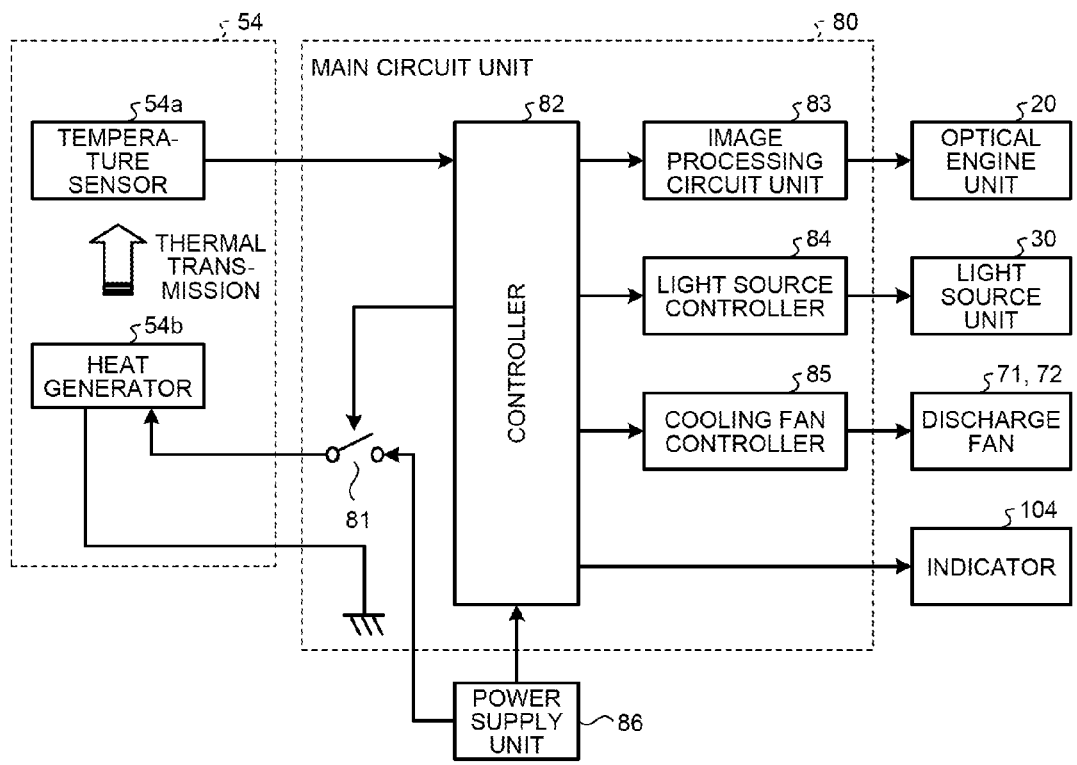
FIG. 12 is a block diagram of a main circuit unit that performs an operation for protecting the projector.

FIG. 12 is a block diagram of a main circuit unit 80 that operates an operation for protecting the projector 100. As illustrated in FIG. 12, the main circuit unit 80 monitors lowering of the velocity of air sent from the centrifugal fan 52 on the basis of the output of the temperature detection device 54 and performs the operation for protecting the projector 100.

A power supply 86 supplies power to the heat generator 54*b* of the temperature detection device 54 via a switch 81 that turns on/off under the control of a controller 82 of the main circuit unit 80. In other words, the main circuit unit 80 can acquire both the value of the temperature that is measured by the temperature sensor 54*a* when the heat generator 54*b* is generating heat and the value of the temperature that is measured by the temperature sensor 54*a* when the heat generator 54*b* is not generating any heat.

The value of the temperature measured by the temperature sensor 54*a* when the heat generator 54*b* is not generating any heat is equal to the value of the measured temperature outside the centrifugal fan 52 regardless whether clogging of the centrifugal fan 52 has occurred. In contrast, the value of the temperature measured by the temperature sensor 54*a* when the heat generator 54*b* is generating heat varies depending on the velocity of external air that is sent from the centrifugal fan 52. If the blowing ability lowers due to clogging of the centrifugal fan 52, etc., the heat generated by the heat generator 54*b* cannot be cooled off with air and the ratio of heat to be transmitted to the temperature sensor 54*a* increases and accordingly the value of the temperature measured by the temperature sensor 54*a* increases.

Because the value of the temperature measured by the temperature sensor 54*a* when the heat generator 54*b* is generating heat is equivalent to the temperature outside the centrifugal fan 52, the value can be used as a reference temperature. In other words, the difference between the value of the temperature measured by the temperature sensor 54*a* when the heat generator 54*b* is not generating any heat, which is a value used as a reference, and the value of the temperature measured by the temperature sensor 54*a* when the heat generator 54*b* is generating heat serves as an index indicating lowering of the blowing ability resulting from clogging of the centrifugal fan 52.

The controller 82 of the main circuit unit 80 monitors lowering of the ability to take in external air resulting from clogging of the filter, etc. Specifically, first, the controller 82 of the main circuit unit 80 controls the switch 81 and acquires the value of the temperature measured by the temperature sensor 54*a* when power is being supplied to the heat generator 54*b* and regards the measured temperature value as a first measured temperature value. The controller 82 of the main circuit unit 80 then controls the switch 81 and acquires the value of the temperature measured by the temperature sensor 54*a* when power is not being supplied to the heat generator 54b and regards the measured temperature value as a second measured temperature value. The difference between the first measured temperature value and the second measured temperature value serves an index indicating lowering of the blowing ability of the centrifugal fan 52. If the difference between the first measured temperature value and the second measured temperature value is equal to or greater than a given value, the controller 82 of the main circuit unit 80 performs an operation for protecting the projector 100.

For example, for the operation for protecting the projector 100, a display is made of the fact that an error has occurred in the centrifugal fan 52 with an image display function of the projector 100. Specifically, the controller 82 controls the optical engine unit 20 via an image processing circuit unit 83 such that the projected image displays the fact that an error has occurred.

For example, for the operation for protecting the projector 100, the amount of the illuminating light from the light source 31 is reduced. Specifically, the controller 82 controls the amount of power to be supplied to the light source 31 of the light source unit 30 via a light source controller 84.

For the operation of protecting the projector 100, for example, the rotation speed of the cooling fan is increased. The cooling fan is a fan of the projector 100, other than the centrifugal fan 52, such as the suction fan 51, the first discharge fan 71, or the second discharge fan 72. Specifically, the controller 82 increases the amount of power to be supplied to, for example, the first discharge fan 71 or the second discharge fan 72 via a cooling fan controller 85.

Alternatively, for the operation of protecting the projector 100, for example, an indicator 104 of the projector 100 is caused to light up or blink. The projector 100 includes the indicator 104 that is provided to the top cover (see FIG. 1) and the controller 82 performs lighting up or blinking with the indicator 104 as a display of caution.

As described above, in the embodiment, the heat generator 54b and the temperature sensor 54a, which is provided to be adjacent to the heat generator 54b, are provided in the vicinity of the ejection port of the centrifugal fan 52, which allows monitoring of lowering of the blowing ability of the centrifugal fan 52.

According to the embodiment, it is possible to monitor lowering of the blowing ability of the blower for sending the air circulating in the casing to the light source.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection device comprising:
a blowing unit configured to send air circulating through a casing to a light source;
a heat generator configured to generate heat with supply of power and that is provided in the vicinity of an ejection port of the blowing unit;
a temperature detector that is provided to be adjacent to the heat generator; and
a controller configured to,
monitor lowering of the velocity of the air, which is sent from the blowing unit, on the basis of a value of a temperature measured by the temperature detector,
control the supply of power to the heat generator to acquire, as a first measured temperature, a value of a temperature measured by the temperature detector when the heat generator is generating heat and to acquire, as a second measured temperature, a value of a temperature measured by the temperature detector when the heat generator is not generating any heat,
on the basis of the difference between the first measured temperature and the second measured temperature, monitor the lowering of the velocity of the air sent from the blowing unit,
perform a protection operation for protecting the image projection device if the difference between the first measured temperature and the second measured temperature is equal to or greater than a given value, the protection operation including an operation for displaying that an error has occurred in the blowing unit with an image display function of the image projection device.

2. The image projection device according to claim 1, wherein, the protection operation includes an operation for reducing the amount of illumination from the light source of the image projection device.

3. The image projection device according to claim 1, wherein the protection operation includes an operation for increasing the rotation speed of a cooling fan of the image projection device.

4. The image projection device according to claim 1, wherein the protection operation includes an operation for causing an indicator of the image projection device to light up or blink.

5. A method of controlling an image projection device that includes a blowing unit, a heat generator, and a temperature detector, the blowing unit configured to send air circulating through a casing to a light source, the heat generator configured to generate heat with supply of power and that is provided in the vicinity of an ejection port of the blowing unit, the temperature detector provided to be adjacent to the heat generator, the method comprising:
controlling the supply of power to the heat generator to acquire, as a first measured temperature, a value of a temperature measured by the temperature detector when the heat generator is generating heat and to acquire, as a second measured temperature, a value of a temperature measured by the temperature detector when the heat generator is not generating any heat,
monitoring, on the basis of the difference between the first measured temperature and the second measured temperature, lowering of the velocity of the air, which is sent from the blowing unit,
performing a protection operation for protecting the image projection device if the difference between the first measured temperature and the second measured temperature is equal to or greater than a given value, the protection operation being an operation for displaying that an error has occurred in the blowing unit with an image display function of the image projection device.

* * * * *